3,165,549
CARBANIL-HYDROXAMIC ACID ESTERS
Henry Martin, Basel, Hans Aebi, Riehen, and Ludwig Ebner, Stein, Aargau, Switzerland, assignors to Ciba Limited, Basel, Switzerland, a company of Switzerland
No Drawing. Filed Jan. 16, 1962, Ser. No. 166,710
Claims priority, application Switzerland, Jan. 19, 1961, 638/61
5 Claims. (Cl. 260—552)

The reaction of phenyl isocyanate with O-alkylhydroxylamine is known (see J. Am. Chem. Soc. 49, page 1538 [1927]).

The present invention is based on the unexpected observation that the new carbanil-hydroxamic acid esters which contain a trifluoromethyl group and correspond to the general formula

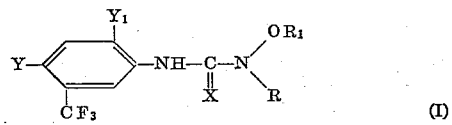

in which R and $R_1$ each represent an alkyl radical containing 1 to 3 carbon atoms, Y and $Y_1$ each represent a hydrogen atom or a halogen atom, namely fluorine, chlorine, bromine or iodine, and X represents an oxygen or sulfur atom, are excellent agents for influencing plant growth, especially in combating weeds. The new compounds are distinguished above all by their selective action.

Those compounds of the general Formula I possess an especially valuable action in which R and $R_1$ each represent a methyl or ethyl radical, Y and $Y_1$ each represent a hydrogen, chlorine or bromine atom, and X represents an oxygen or sulfur atom.

Accordingly, the present invention provides compounds of the general Formula I and preparations for combating undesired plant growth which contain one or more compounds of the general Formula I as active substances.

The new active substances of the general Formula I can be prepared by methods in themselves known, for example, by reacting 3-trifluoromethyl-phenyl isocyanate with methyl-hydroxyl-amine methyl ether, or by reacting the said phenyl-isocyanate with O-methyl-hydroxylamine followed by alkylation with an N:N-dialkyl sulfate. The corresponding substances are also obtained, for example, by reacting an N-methyl-N-methoxy-carbanilic acid ester with trifluoromethyl-aniline or a halogen substitution product thereof.

As examples of carbanil-hydroxamic acid esters, which are especially suitable for combating undesired plant growth, there may be mentioned:

3-trifluoromethyl - carbanil - N - methyl - hydroxamic acid methyl ester,
3 - trifluoromethyl - 4 - chloro - carbanil - N - methyl-hydroxamic acid methyl ester,
3-trifluoromethyl-thiocarbanil-N-methyl-hydroxamic acid methyl ester,
3-trifluoromethyl-carbanil-N-ethyl-hydroxamic acid methyl ester, and
3-trifluoromethyl-carbanil-N-ethyl-hydroxamic acid ethyl ester.

Especially advantageous is the fact that, for example, 3-trifluoromethyl - carbanil - N - methyl - hydroxamic acid methyl ester, exhibits a reliable action when applied by the pre-emergence and also the post-emergence method.

The active compounds of the general Formula I can be used in the form of dusting agents or of emulsions, dispersions or solutions. Solid carriers suitable for the manufacture of dusting agents are talcum, kaolin, bentonite, calcium carbonate, or calcium phosphate, or carbon, cork meal, wood meal or other material of vegetable origin. The various forms of preparations containing the new active compounds may include the usual additions which are added to improve the dispersion, adhesion, penetration or resistance to rain. As such additions there may be mentioned fatty acids, resins, glue, casein or, for example, an alginate.

The preparations may be emulsion concentrates or wettable powders from which aqueous liquors can be prepared for use by the addition of water. Suitable emulsifiers or dispersing agents are quaternary ammonium or phosphonium compounds, soaps, soft soaps, aliphatic sulfuric acid esters, salts of aliphatic-aromatic sulfonic acids, alkoxy-acetic acids, polyglycol ethers of fatty alcohols and polyethylene oxide condensation products.

For preparing solutions suitable for spraying as such there may be used, for example, mineral oil fractions having a high to medium boiling range, such as diesel oil or kerosene, or crude oils, also coal tar oils or oils of vegetable or animal origin, and also hydrocarbons such as alkylated naphthalenes or tetrahydronaphthalene, if desired, in conjunction with xylene mixtures, cyclohexanols or ketones, or also halogenated hydrocarbons such as tetrachlorethane, trichlorethylene, trichlorobenzenes or tetrachlorobenzenes. In special cases there may be used alcohols or mixtures of alcohols such, for example, as butanol, amyl alcohol, isopropanol, dodecyl alcohol, lactic acid esters, glycols or their ethers, or diacetone alcohol, or amides such as formamide, dimethylformamide or dimethylacetamide, or nitriles such as acetonitrile or isobutyronitrile.

By the addition of other herbicides it is possible to modify or enhance the action of the new compounds. Thus, it is possible, for example to enhance the action of the new compounds on certain broad-leaved weeds by the addition of substituted phenoxyalkane carboxylic acids or salts, esters or amides thereof. Instead of the phenoxy-alkane carboxylic acids, there may be used halogenated benzoic acids or phenylacetic acids or their nitriles. By adding carbamates, thiocarbamates, thiol-carbamates or dithio-carbamate, or halogenated fatty acids or salts, esters and amides thereof, there are obtained preparations having an intensified total herbicidal action.

The new compounds are advantageously used in admixture with fertilizers. The term "undesired plant growth" is used herein with reference to undesired plants in general, and therefore includes undesired crop plants.

When applied at a higher rate, for example 15 kg. per hectare, the new compounds exhibit a good action as total herbicides having a short active period, so that soil treated with them can be re-used after a relatively short time for the cultivation of desired plants.

The following examples illustrate the invention:

*Example 1*

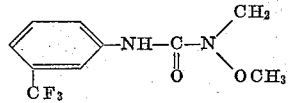

A solution of 10 grams of anhydrous sodium carbonate in 100 cc. of water is run into a solution of 15 grams of methyl-hydroxylamine methyl ether hydrochloride in 100 cc. of water, and a solution of 19 grams of 3-trifluoromethylphenyl isocyanate in 20 cc. of acetonitrile is then added dropwise. The condensation product, namely 3-trifluoro-methyl-carbanil-N-methylhydroxamic acid methyl ester, precipitates immediately, and is filtered off, washed with water and dried in vacuo at 50° C. The yield of crude product is 23 grams. It melts at 84–89° C. After recrystallization from hexane the product melts at 86–91° C.

*Analysis.*—$C_{10}H_{11}O_2N_2F_3$. Calculated: N=11.29%. Found: N=11.52%.

*Example 2*

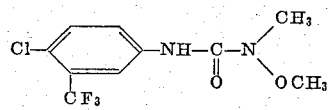

A solution of 15 grams of methyl-hydroxylamine methyl ether hydrochloride in 100 cc. of water is rendered weakly alkaline with sodium carbonate, and then mixed with a solution of 22 grams of 3-trifluoromethyl-4-chlorophenyl isocyanate in 20 cc., of acetonitrile. The resulting 3 - trifluoromethyl - 4 chlorocarbanil - N - methyl-hydroxamic acid methyl ester precipitates immediately. After drying the precipitate in vacuo, the yield of crude product amounts to 27 grams, melting at 95–99° C. After recrystallization, from cyclohexane and a small amount of hexane, the product melts at 96–100° C.

The reaction with methyl-hydroxylamine methyl ether can also be carried out in an organic solvent, for example, in benzene.

*Analysis.*—$C_{10}H_{10}O_2N_2ClF_3$. Calculated: C=42.49%, H=3.57%, Cl=12.54%. Found: C=42.63%, 4=3.71%, Cl=12.37%.

*Example 3*

10 grams of the compound obtained as described in Example 1 and 2 grams of sulfite cellulose waste liquor are mixed with 100 cc. of water, and the mixture is subjected to intensive grinding to form a finely dispersed stable dispersion.

*Example 4*

Seeds of *Setaria italica, Dactylis glomerata, Sinapis alba, Medicago sativa, Lepidium sativum* and *Calendula chrysantha* were sown in flowerpots filled with earth in a greenhouse, and then watered. Two days after the sowing the surface of the earth in the flowerpots was sprayed with the dispersion obtained as described in Example 3 at a rate corresponding to 2 kg. of active substance per hectare. 25 days after this application the test plants were completely or almost completely destroyed, after being strongly inhibited coupled with complete dechlorophyllation. Similar results were obtained when the dispersion of Example 3 was replaced by a dispersion which had the same composition and had been prepared in the same manner, except that it contained as active substance, instead of the compound of Example 1, one of the following compounds:

(a)

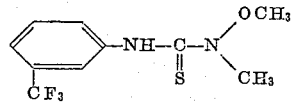

(b)

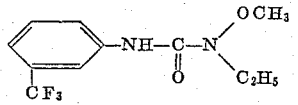

(c)

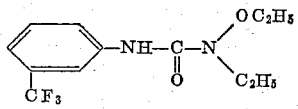

*Example 5*

Flowerpots were prepared in the manner described in Example 4. The treatment with a dispersion prepared in the manner described in Example 3 at a rate corresponding to 2 kg. of active substance per hectare, was carried out when the plants had developed a third leaf. With the exception of *Dactylis glomerata*, whose complete destruction takes longer, all plants had died off completely within 3 weeks after the treatment, after having undergone complete dechlorophyllation. Similar results were obtained when the dispersion of Example 3 was replaced by one which had the same composition and had been prepared in the same manner, except that the active substance of Example 1 had been replaced by one of the compounds set forth above in Example 4 under (a), (b) and (c).

*Example 6*

10 grams of the compound of Example 2 and 2 grams of sulfite cellulose waste liquor are mixed with 100 cc. of water, and the mixture is subjected to intense grinding to form a fine dispersion.

*Example 7*

Flowerpots, in which the plants named below had been sown, were sprayed with a dispersion prepared as described in Example 6, at a rate corresponding to 2 kg. of active substance per hectare, as soon as the plants had developed a third leaf. On evaluation it was observed that primarily the dicotyledonous plants had suffered very considerable damage, while the monocotyledons, namely *Zea mays, Avena sativa, Setaria italica, Dactylis glomerata* and *Medicago sativa*, were largely unaffected, whereas *Sinapis alba, Lepidium sativum* and *Calendula chrysantha* had been almost completely destroyed.

Similar results are obtained when the dispersion of Example 6 was replaced by one having the same composition, and prepared in the same manner, except that it contained as active principle, instead of the compound described in Example 2, one of the following compounds:

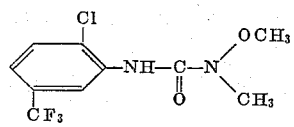

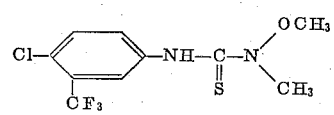

*Example 8*

In an extended test in a greenhouse the following plants were sown in pots and 2 days later treated with a dispersion prepared as described in Example 3 or 6, at a rate corresponding to 2 kg. of active substance per hectare: *Medicago sativa, Lactuca sativa, Spinacia oleracea, Linum usitatissimum, Daucus carota, Beta vulgaris, Soja max, Poa trivialis, Alopecurus myosuroides, Phaseolus vulgaris* and *Allium cepa*. 25 days after treatment with the dispersion of Example 3 containing the compound of Example 1, the plants had been killed completely or almost completely, except *Phaseolus vulgaris* which was only strongly inhibited, and *Daucus carota* and *Soja max* which were not damaged by the aforesaid compound.

25 days after treatment with the dispersion of Example 6 containing the compound of Example 2, the plants were substantially completely destroyed, except for *Daucus carota* and *Phaseolus vulgaris*.

*Example 9*

Flowerpots were prepared as described in Example 8. The treatment with a dispersion prepared as described in Example 3 and 6, respectively, each applied at a rate corresponding to 2 kg. of the active substance per hectare, was carried out when the plants had developed a third leaf. 3 weeks after the treatment with the compounds of Examples 1 and 2, respectively, the plants listed in Example 8 had been completely or almost completely destroyed, except for *Daucus carota* and *Phaseolus vulgaris*.

*Example 10*

For tests in an open field there were prepared wettable powders containing 50% of the active compound of Example 1, 45% of kaolin and 5% of lignin-sulfonic acid. Instead of kaolin there may be used another filler, for example, talcum or chalk, and instead of lignin-sulfonic acid another dispersing agent, for example, an alkyl-aryl sulfonate or a non ionic dispersing agent or a mixture thereof.

Example 11

The compound of Example 1 was tested in an open field in the form of a wettable powder prepared as described in Example 10 at a rate corresponding to 1.5 to 2.5 kg. of active substance in 1000 liters of water per hectare, for its selective weed killing action in crops of carrots, celery and leek. The crops named were not damaged by the herbicide, but a good destructive action on the weeds was observed. When applied in the pre-emergence period of the weeds, a good destructive action was achieved on grass-like weeds, such as *Panicum crus galli* and *Agropyron repens*.

Example 12

The soil of a vineyard free from weeds was treated with 5.0 kg. of active substance per hectare in the form of a wettable powder prepared as described in Example 10 in 1000 liters of water per hectare. While the vines were not damaged, a good destructive action on the germinating seeds of Stellaria, Cirsium, Euphorbia, Anagallis, Senecio, Polygonum, Taraxacum and Trifolium was achieved.

What is claimed is:
1. A compound of the formula

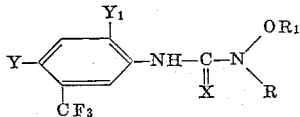

in which R and $R_1$ each represent an alkyl radical of 1 to 3 carbon atoms, Y and $Y_1$ each represent a member selected from the group consisting of a hydrogen atom and a halogen atom, and X represents a member selected from the group consisting of an oxygen atom and a sulfur atom.

2. The compound of the formula

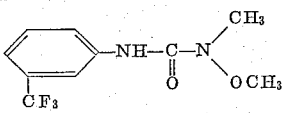

3. The compound of the formula

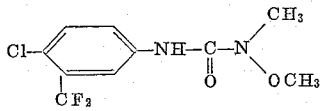

4. The compound of the formula

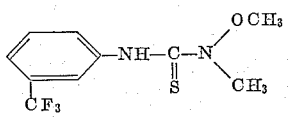

5. The compound of the formula

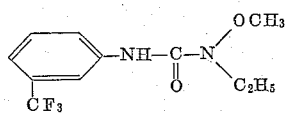

References Cited in the file of this patent
UNITED STATES PATENTS

| | | |
|---|---|---|
| 2,663,729 | Searle et al. | Dec. 22, 1953 |
| 2,663,730 | Hill et al. | Dec. 22, 1953 |
| 2,704,245 | Searle | Mar. 15, 1955 |
| 2,705,195 | Cupery et al. | Mar. 29, 1955 |
| 2,723,192 | Todd | Nov. 8, 1955 |
| 2,960,534 | Scherer et al. | Nov. 15, 1960 |
| 3,000,940 | Raasch | Sept. 19, 1961 |

OTHER REFERENCES

Abel: Chemistry and Industry, Aug. 17, 1957, pages 1106–12.